United States Patent

Lamb

[15] 3,688,189
[45] Aug. 29, 1972

[54] REAL-TIME INITIAL ATMOSPHERIC GRADIENT MEASURING SYSTEM

[72] Inventor: James J. Lamb, Cupertino, Calif.

[73] Assignee: The United States of America as represented by the Secretary of the Army

[22] Filed: May 28, 1971

[21] Appl. No.: 148,001

[52] U.S. Cl. ............... 324/58.5 B, 356/5, 356/128
[51] Int. Cl. ............................................. G01r 27/04
[58] Field of Search..... 324/58 B, 58.5 B; 356/5, 107, 356/128

[56] References Cited

UNITED STATES PATENTS

| | | |
|---|---|---|
| 3,437,821 | 4/1969 | Thompson, Jr. et al ................ 356/128 X |
| 3,446,559 | 5/1969 | Astheimer et al. ........ 356/128 |
| 3,562,642 | 2/1971 | Hochschild ........... 324/58.5 B |
| 3,625,619 | 12/1971 | Scholdstrom.............. 356/128 |
| 3,629,698 | 12/1971 | Lamb.................... 324/58.5 B |

Primary Examiner—Stanley T. Krawczewicz
Attorney—Harry M. Saragovitz, Edward J. Kelly and Herbert Berl

[57] ABSTRACT

A preferred embodiment of the invention is a mesocavity integrating refractometer system for measuring atmospheric refractivity consisting of a single-frequency coherent radio wave interferometer system of obtuse triangular configuration along a slant-path wherein a continuous microwave transmitter located at the obtuse apex of the configuration is adapted to direct a microwave beam signal to a first plane reflector at the most acute apex of the configuration and to direct a microwave beam signal along a horizontal path associated with the slant-path to a second plane reflector on the horizontal path whereby said beams are reflected along their respective paths to the less acute angle of the configuration to receiver means located thereat and comprising a phase-lock loop receiver in combination with a slave receiver. First receiving antenna means coupled to first input means to the slave receiver is oriented and critically aimed to the reflected beam along the slant-path and second receiving antenna means coupled to second input means to the slave receiver is oriented and critically aimed to the reflected beam along the horizontal path. The phase-lock loop receiver is phase-locked to the horizontal path microwave signal and supplies locally generated oscillatory energy to the slave receiver for intermediate frequency conversion, detection, and phase reference. The slave receiver has incorporated therein a phase comparator providing as an output resultant difference voltages proportional to the phase angle between the intermediate frequency voltages of the slave receiver which are derived from the slant-path microwave beam and the microwave beam directed and reflected along the horizontal path. Switching means are provided whereby the first input means and the second input means are alternately switched to the input of the slave receiver whereby the outputs of the slave receiver are varying D.C. voltages directly proportional to the variations in the atmospheric refractivity along the slant-path and horizontal path, respectively.

11 Claims, 15 Drawing Figures

INVENTORS
James J. Lamb
By: Harry M. Saragovitz, Edward J. Kelly &
Herbert Berl
ATTORNEYS.

INVENTOR,
James J. Lamb

REAL-TIME INITIAL ATMOSPHERIC GRADIENT MEASURING SYSTEM

The invention described herein may be manufactured, used, and licensed by or for the Government for governmental purposes without the payment to me of any royalty thereon.

This invention relates to real-time radio meteorological refractive index measuring systems and more particularly to a system and/or method for real-time determination of the initial radio refractive vertical gradient in the immediate atmospheric environment of the affected station site. The invention also relates to real-time application of the initial gradient to radio refraction error correction and to prediction of extended range radio propagation beyond normal line-of-sight.

This invention employs substantially the means disclosed in my pending application Ser. No. 30,404, filed Apr. 21, 1970, now U.S. Pat. No. 3,629,698, and entitled Meso-Cavity Specular Integrator Refractometer (McSIR). However, in the present invention the McSIR system is disposed in a slant-path configuration in combination with auxiliary surface means to determine vertical atmospheric refractive index or refractivity gradient variations in real-time as the difference between the concurrent slant-path and surface refractivity measurements.

The extreme importance of the effect of the initial refractive vertical gradient on radio or radar wave propagation has been long recognized by those skilled in the art, especially with respect to radio frequencies in the ultra-short wavelength portion of the spectrum above 300 MHz and extending through 30,000 MHz. The observed effect as the refractivity gradient varies with time is refraction or bending of the wave path from an approximately geometrical straight line into a more or less curved trajectory in the vertical plane. This effect becomes progressively more pronounced as the initial elevation angle of the wave approaches the horizontal. Especially below an initial elevation angle of 2°, the bending effect on a radar wave's path becomes so unpredictable that rectification by standard atmospheric statistical model means of refraction error correction is precluded. Thus elevation position measurement at lower angles is restricted only to coarse approximation because of the larger and larger amount of uncertainty as the elevation angle approaches zero. In practice, it has been found that radar tracking of targets for vertical position determination must be abandoned below apparent elevation angles of 2°. Horizontal variations in refractive index are well known to be negligible in comparison to vertical gradients and are not usually a concern.

An initial gradient method has been developed and published by B. R. Bean and G. D. Thayer for calculating the predicted refraction error due to varying refractice index below 2° and down to zero under all weather conditions, provided the actual value of the initial refractive index gradient is known. This initial gradient method was first described by Bean and Thayer in a paper entitled "Models of the Atmospheric Radio Refractive Index," published in the Proceedings of the Institute of Radio Engineers, Vol. 47, No. 5, Part 1, May 1959, pp 750–753. However, use of this method requires real-time, accurate measurement of the varying refractive index gradient in at least the first 100 meters (328 feet) of altitude above surface at or near the radar station site. Heretofore, the only available practical means for making this determination has been meteorological instrumentation and subsequent calculation of refractivity at several discrete altitude points from separate measurements of atmospheric pressure, temperature and humidity. The calculation is then performed by using these parameters in the Smith-Weintraub formula.

Either a high tower to support the instruments or a balloon to carry them upward was proposed in the above cited reference. Both of these expedients have been found inadequate in accuracy and uneconomical for operational purposes where high degree of elevation angle accuracy is required. The diverse accuracy and unreliability of the usual meteorological instruments for airborne measurement of humidity, the principal influence on radio refractivity, is notorious, especially in the first few hundred feet of altitude, while the individual ideosyncracies of a plurality of discrete instruments for simultaneous measurements of refractivity along a vertical prevent efficient determination of the continuous gradient. The collection, transmission and subsequent reduction of data involved with such means, in addition to material and manpower cost is such that meteorological systems are not only insufficient accurate for the purpose, but also are economically unfeasible for continuous, round-the-clock, operation as is necessary for real-time requirements. For instance, the radiosonde meteorological data collection method is presently estimated to cost $100 per single flight, of which $55 is the cost of expendable material. The maximum possible frequency of flights at one site is restricted by operational technical limitations to one every 20 minutes, which is less than real-time by a considerable margin. Even then the cost would be $300 per hour or over $7,000 per 24-hour day, while the accuracy would be inaccurate for the purpose. For example, the uncertainty in low-level refractivity gradient data from individual radiosonde flights at Fort Huachuca, Arizona, has been determined to be approximately plus or minus 6 N units. The requirement employing the initial gradient correction method is for accuracy to at the most plus or minus 1 N unit and preferably ½ N unit or better. I have found this latter precision in determination of the N-gradient is necessary to attain accuracy to plus or minus 0.05 milliradium of elevation angle in correcting very low-level, e.g., 0.5 degree, height-position radar refraction errors. Furthermore, it is very advantageous that the refractivity gradient be determined from a slant-path sample of the atmosphere that is representative of a volume extending a mile or so horizontally as well as 325 feet or more vertically. In order to avoid erroneous spot sampling due to small pockets of atmosphere, it is essential that the sampling be continuously integrated spatially throughout the related atmospheric volume as well as controllably averaged in time. These desirable features are all provided by the several embodiments in the instant invention.

Accordingly, it is a prime object of the invention to provide a slant-path meso-cavity specular integrating refractometer in combination with means for surface refractivity measurement whereby a new and improved means for real-time determination of initial atmospheric refractivity gradient as the differential between the slant and surface refractivities is attained.

Another object of the invention is a slant-path meso-cavity specular integrating refractometer in combination with continuously operating meteorological instrumentation providing data that are used to calculate the surface reference value of refractivity from which the meso-cavity specular integrating slant-path refractivity is substracted to obtain the concurrent initial gradient value.

Another object of the invention is a more accurate means and method for automatically determining real-time variations in the initial refractivity gradient employing in combination a slant-path and horizontal meso-cavity specular integrating refractometer with a single transmitter and respective emitting and receiving antenna systems that are cross-polarized as well as angularly directional to minimize mutual interference.

A further object of the invention is a coherent receiving system for the slant-path and horizontal meso-cavity specular integrating refractometer with single transmitter that employs a single phase-lock receiver channel and two slave receiver channels to alternately sample the slant-path and horizontal integrated refractivity, respectively, to obtain an output differential representing real-time variations in the initial refractivity gradient.

The novel features which are considered characteristic of the invention are set forth with particularity in the appended claims. The invention itself, however, both as to its organization and method of operation as well as additional objects and advantages thereof will be best understood from the following description taken in conjunction with the following drawings, in the several figures of which like numerals identify like elements and in which:

FIG. 2c is a graph of the refractivity differential between the meteorological and refractometer curves of FIG. 2a;

FIG. 3a is a graph similar to the graph of FIG. 2a;

FIG. 5b is a diagrammatic representation of the illumination source in the combined slant-path and horizontal path meso-cavity specular integrating refractometer;

FIG. 5c is a diagrammatic representation in perspective of the embodiment of the invention shown in FIG. 5a;

FIG. 7b is a diagrammatic representation in perspective of the embodiment of the invention shown in FIG. 7a.

Figure 1A:
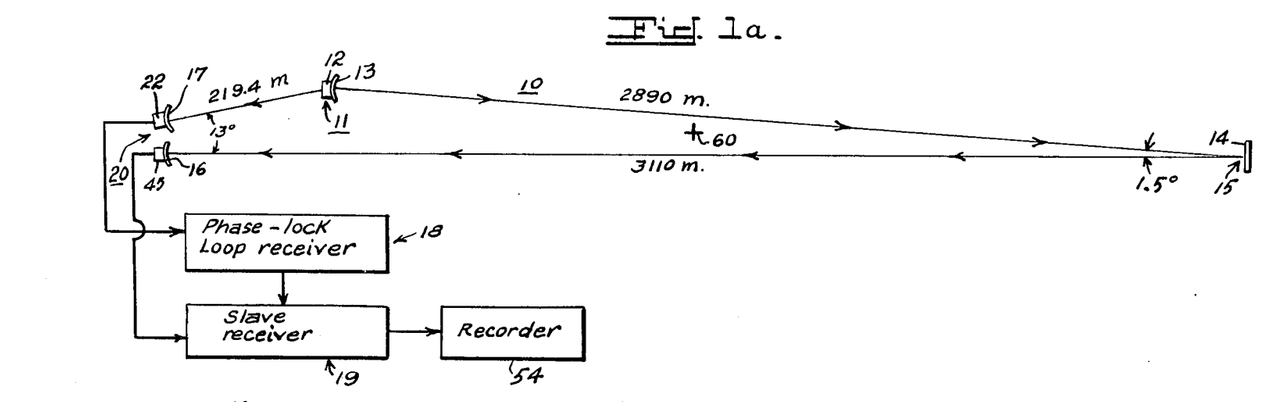
FIG. 1a is a diagrammatic representation in plan view of the slant-path meso-cavity specular integrating refractometer combined with surface meteorological means.
Figure 1B:
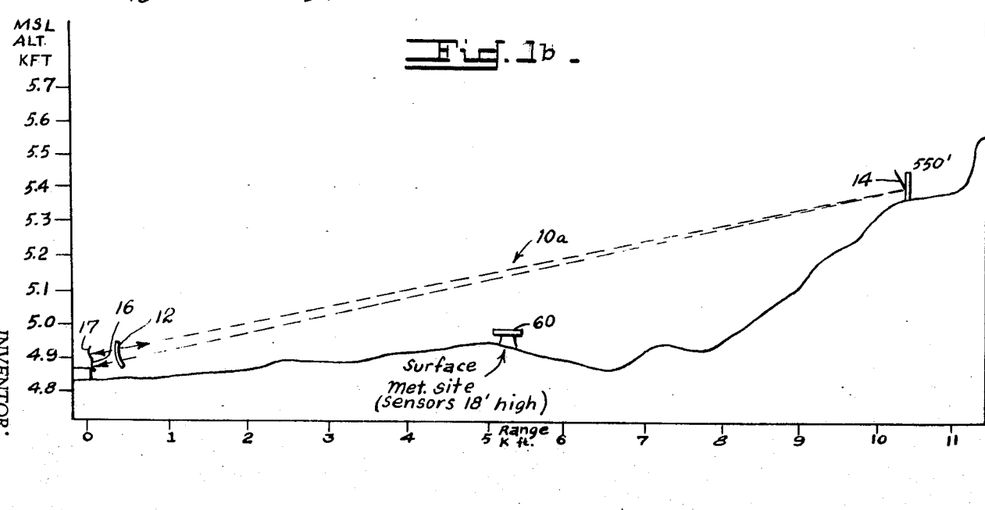
FIG. 1b is a diagrammatic representation in elevation of a slant-path meso-cavity specular integrating refractometer combined with surface meteorological means.
Figure 2A:
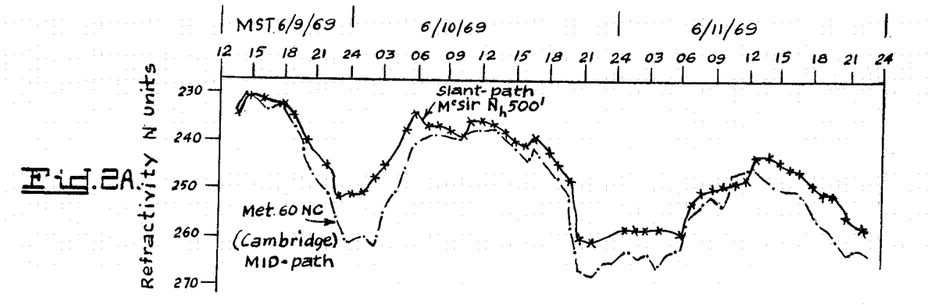
FIG. 2a is a graph of computed midpath meteorological and measured meso-cavity specular integrating refractivity variation.
Figure 2B:
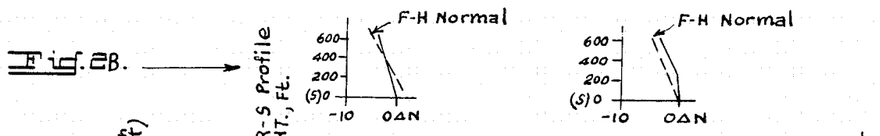
FIG. 2b is a graph of two radiosonde refractivity profiles.
Figure 2C:
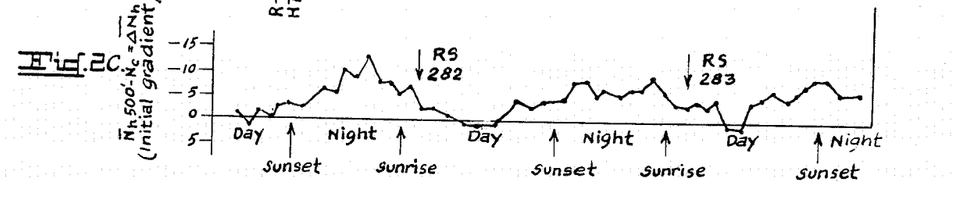
Figure 3A:
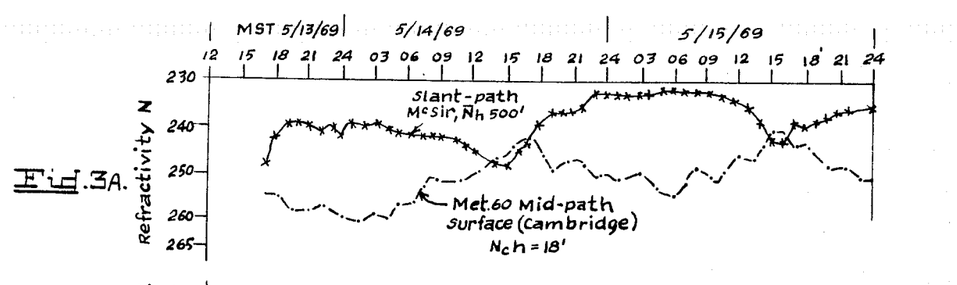
Figure 3B:
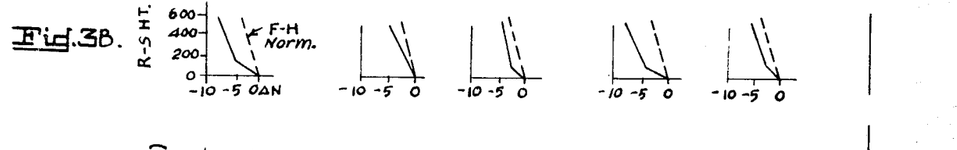
FIG. 3b is a graph similar to the graph of FIG. 2b.
Figure 3C:
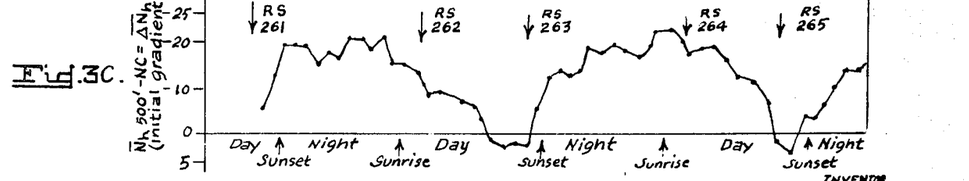
FIG. 3c is a graph similar to the graph of FIG. 2c.

In FIG. 1 there is schematically shown an embodiment of the slant-path McSIR of the invention wherein, in plan, an obtuse triangular configuration is employed as generally indicated by reference numeral 10. The interferometer illumination source at the obtuse apex 11 is a single-frequency highly stable crystal controlled solid state transmitter 12 of rated 750 milliwatt output on 4 GHz. This power is fed to a 6-foot parabolic disk antenna 13 and directed with a forward gain of 33 db and a band-width of 3°, main lobe, down range 2,890 meters on a slant-path 10a, FIG. 1b, to a 100 square foot passive speculum 14 located at the acute apex 15 and at an elevation of approximately 500 feet higher than the elevation of transmitter 12. Speculum 14 has a calculated two-way gain of 86 db and reradiates a main lobe having a calculated two-way gain of 86 db and reradiates a main lobe having a calculated included angle of 1.5°. The measured ratio of the main lobe to first null reflected field strength is 28 db, a power ratio of nearly 1,000 to 1, and the signal level at the input of the speculum receiver antenna 16 was measured as approximately minus 60 dbm which provides a signal-to-noise ratio of more than 60 db and ensures perfect phase variation measurement. The reflected main lobe radiation is precisely aimed back along the slant-path 10a to the 3,110 meter distant receiving parabolic disk antenna 16 at the third apex 20. Simultaneously, the weaker but quite coherent back lobe radiation of the transmitter parabolic disk antenna 13 is picked up over the relatively short distance path of 219.4 meters by the parabolic disk antenna 17 of the phase-lock loop receiver generally indicated by reference numeral 18 and located in the vicinity of the third apex 20 of the triangular configuration 10. The above recited dimensions and characteristics has considerable tolorance and may be varied to accommodate available equipment and physical facilities. The transmitter antenna 13, passive speculum 14, and receiver antennas 16 and 17 angular relationship is chosen so that the parabolic antenna 17 of the phase-lock loop receiver has its main lobe most favorably directional to the back lobe radiation the transmitter parabolic antenna 13 and a side null directional to the reflected beam from the distant speculum 14 while the parabolic antenna 16 of slave receiver 19 has its main lobe most favorable directional to the reflected beam from speculum 14 and its side null directional to the transmitter parabolic antenna 13. I have found that an angle of approximately 13° between the beam axes of the parabolic receiving antennas 16 and 17 provides a desired to undesired signal power of more than 1,000 or 30 db in each receiver in the system. A continuously operating meteorological instrumention 60 such as a Cambridge 110s Automatic Meteorological Measuring Set (Cambridge Systems, Inc., Cambridge, Mass.) is positioned along a horizontal path with respect to slant-path 10a at a point (midpath) intermediate the speculum 14 and receiver antennas 16 and 17. The instrumentation 60 provides data that are used to calculate the surface value of refractivity from which the meso-cavity specular integrating refractometer slant-path refractivity is substracted to obtain concurrent initial gradient value. An example of the results obtained through the use of my invention is graphically portrayed in FIGS. 2a-2c and FIGS. 3a-3c. The graph of FIG. 2a shows an example of hourly samples of computed midpath meteorological and measured meso-cavity specular integrating refractometer refractivity variation for clear weather conditions of very low humidity and near normal gradient. FIG. 2b graphically displays the two nearly normal radiosonde refractivity profiles of RS No. 282 and RS No. 283 obtained at early morning hour on successive days. FIG. 2c is a graph of the refractivity differential between the meteorological and refractometer curves of FIG. 2a, showing excellent agreement with the near normal radiosonde gradients. A further example of the results obtained by the use of my invention is illustrated in FIGS. 3a-3c wherein FIG. 3a is a graph of the same type of data as FIG. 2a for disturbed warm weather conditions with near by thunder storms in the area and increased humidity; FIG. 3b shows graphs of five radiosonde profiles (RS Nos. 261-265) obtained in early mornings and afternoons indicating various degrees of refractivity gradient; and FIG. 3c is a graph of the refractivity gradiented represent by the differential between the two curves of FIG. 3a showing daytime gradients supported by the radiosonde profiles, as well as nighttime gradients sufficient to cause much greater than normal refraction of radio/radar waves.

In regard to the slant-path McSIR in the several embodiments of the invention, atmospheric refractivity is additive, for example, in the approximately 30 times longer two-way slant-path from transmitter 12 to reflector or speculum 14 and back to the plane of the transmitter 12 site. However, the refractivity variation essentially cancels in the converging short path from the transmitter 12 to phase-lock loop receiver parabolic antenna 17, and the nearly equal portion of the return path between the transmitter 12 site plane and slave receiver parabolic antenna 16. Further, I have found that variation in the received signal strength has no measurable effect on the accuracy of refractivity measurements.

Figure 4:
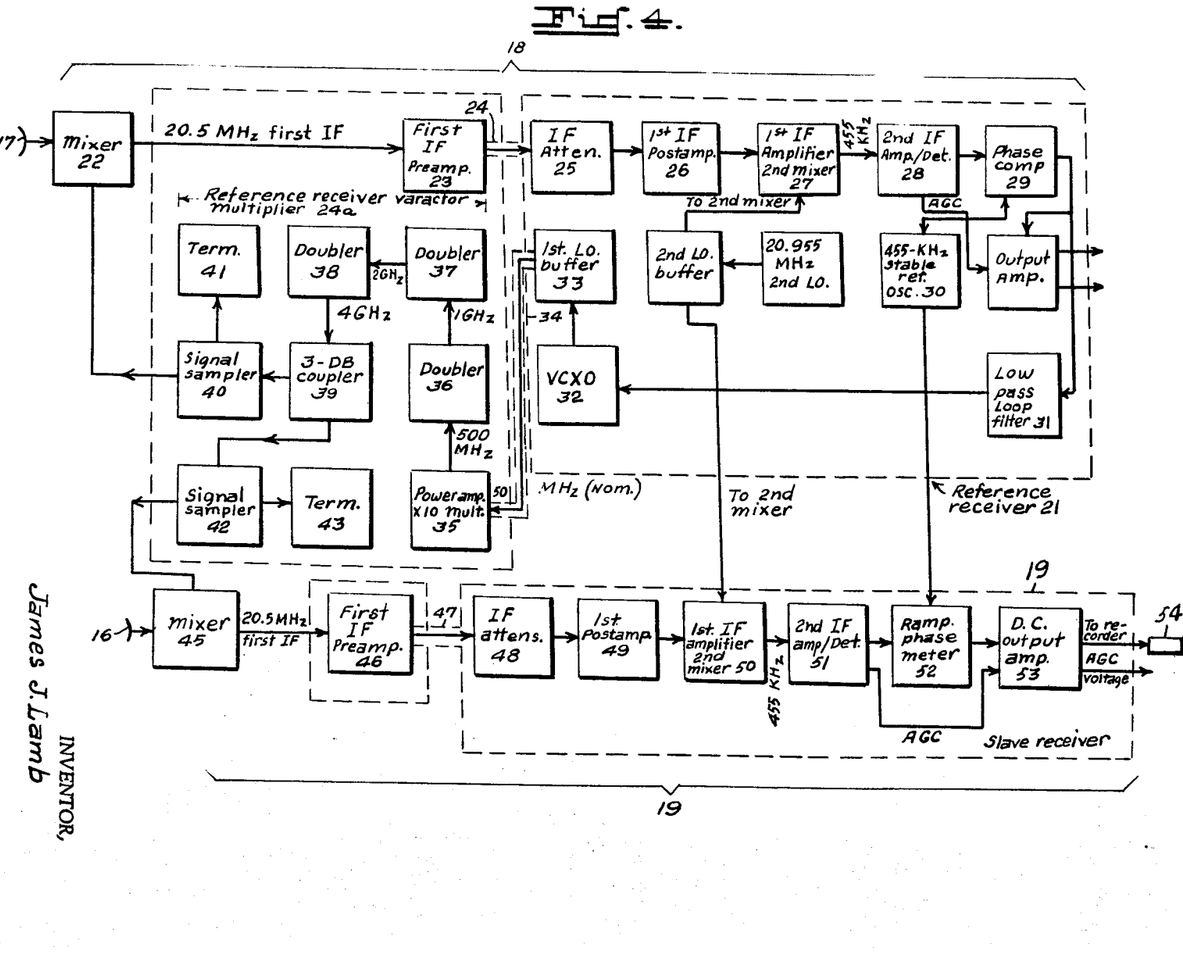
FIG. 4 is a block diagram illustrating a radio receiver means employed in the invention.

Coherence is the essence of the meso-cavity specular integrating refractometer and is obtained by the inherent coherence of the passive reflector or speculum 14 and functional receiver configuration illustrated in FIG. 4 and FIG. 6 and subsequently described herein. The passive reflector or speculum simply reverses the phase exactly 180° without delay. Briefly the functional receiver configurations comprise the phase-lock loop receiver 18 which is phase-locked to transmitter 12 and supplies coherent first and second local oscillator and reference voltages through buffers to slave receiver 19. Thus, the unique independent variable is phase difference between the transmitted and received waves; and this difference is directly proportional to variation in phase velocity of the reflected signal; that is, the phase difference is equal to variation in refractivity of the intervening atmosphere.

The output phase variation is directly related to refractivity as follows:

$$\Delta\Phi/n = (2\pi/\lambda) \times \Delta n \times 2Lp$$

wherein:
$2\pi$ (radians) equals 360° of phase angle;
$\Delta n$ is the refractive index, practically $1\times10^{-6}$ or 1 $N$ unit;
$\lambda$ is the wavelength of the transmitted wave in cm; and
$Lp$ is the length of the path from the transmitter to reflector in cm.

Refractivity, $N$, is a convenient measure of atmospheric radio refractive index, $n$, the latter being the ratio of the velocity of an electromagnetic wave in vacuum to its actual velocity in the atmosphere. $N=(n-1)10^6$ and has typical surface values ranging 325 to 225 at 5,000 foot altitude above mean sea level. It is calculated from meteorological data by the well known Smith-Weintraub formula, $N - 77.6\ P/T + 373000\ e/t^2$, where $N$ is refractivity in $N$ units, $P$ is barometric pressure in millibars, $T$ is temperature in degrees Kelvin and $e$ is the partial pressure of water vapor in millibars.

The receiver system employed in several embodiments of my invention consists of two receivers generally indicated by reference numeral 18, the phase-locked loop receiver, and numeral 19, the slave receiver is connected to form a single receiver with coherent channels. FIG. 4 is a detailed block diagram broken down into functional modules as they appear in the receiver. The units inclosed in dashed lines are located in separate units or receiver racks. The reference receiver 21 is a phase-lock subsystem operating with a phase-stable input signal at 3.995 GHz received by parabolic antenna 17 from the back lobe of radiation from parabolic antenna 13 whose forward radiation is along slant-path 10a to reflector 14. This signal is mixed in the local oscillator mixer 22 and down converted therein to 20.5 MHz and amplified in the IF preamplifier 23. The mixer 22 which is coupled to receiving antenna 17 and first preamplifier 23 and the modules comprising the reference receiver varactor multiplier 24 are mounted on a rack adjacent antenna 17.

The 20.5 MHz output signal from IF preamplifier 23 is fed down along coaxial cable 24 to a receiving shelter, not shown, attenuated by means of attenuator 25, amplified in the first IF post amplifier 26 and then down converted in the module identified as the first IF amplifier and second mixer 27 to 455 KHz. The 455 KHz signal is then filtered in the second IF amplifier module 28 and further amplified. The output of second IF amplifier module 28 is applied to one input of phase comparator 29 where it is compared with the signal from the very stable reference oscillator 30. The difference in the form of the output phase error signal at the output of phase comparator 29 is applied to the loop input where it is filtered by loop filter 31 and fed back to the voltage-controlled crystal oscillator 32. This filtered phase error adjusts the frequency and phase of the voltage-controlled crystal oscillator 32 to provide a constant phase difference between the multiplied output and the received signal. Thus the voltage-controlled crystal oscillator 32 tracks the received signal phase and is maintained in constant phase relationship with the transmitted signal.

The approximately 50 MHz output of the voltage-controlled crystal oscillator 32 is amplified in the first local oscillator-buffer module 33 and then fed through a coaxial cable 34 to the varactor multiplier down converter 24a located at the receiving parabolic antenna 17. This actual frequency in this case is 50.25 MHz which is amplified and multiplied by a factor of 10 to provide an output of 502.5 MHz by means of multiplier module 35. The 502.5 MHz output of module 35 is doubled by means of doubler 36, doubled again by means of doubler 37 and doubled a third time to 4 GHz by means of doubler 38. Thus, the 50.25 MHz voltage-controlled crystal oscillator 32 is multiplied 80 times to provide phase-locked first local-oscillator (module 33) at 4.02 GHz.

The output of the 4 GHz doubler is applied to the input of a 3 db coupler 39 which splits the power equally providing two equal power outputs. One of the outputs is fed through signal sampler 40 via means of one of its output terminals to a signal termination 41 and another output terminal thereof is coupled to mixer 22, thus closing the phase-locked loop.

The other output of coupler 39 is coupled by means of signal sampler 42 to a signal termination 43 and also to mixer 45 of slave receiver 19 where it is mixed with the 3.995 GHz signal from slave parabolic antenna 16, providing a coherent signal output at an intermediate frequency of 20.5 MHz. This slave mixer output is fed into the IF preamplifier 46 located in the chassis unit mounted on the back of the slave parabolic antenna 16 is fed down a long coaxial cable 47 to the adjustable IF attenuator 48, through post amplifier 49, first IF amplifier and second mixer module 50 providing coherent output to the second 455 KHz IF amplifier/detector module 51. The respective circuit of each of these modules are similar to those in reference receiver 21. As is well known in the art, the process of successively mixing or heterodyning maintains coherence and thus preserves the original phase information (such as phase velocity variation due to atmospheric refractive index changes) through to the output of 455 KHz IF amplifier of module 51.

The amplified 455 KHz output of the IF amplifier of module 51 through the detector thereof is applied to the signal input of ramp phasemeter 52, and the phase angle difference between the two received signals is read out from ramp phasemeter 52. The output of phasemeter 52 is a varying DC. voltage proportional to the electrical angle variation in degrees, such that a range of from 0–3.6 volts corresponds lineraly to successive ranges from 0° to 360°. Thus, the DC output is directly proportional to variations in atmospheric refractivity. This DC output is coupled by means of DC amplifier 53 to, for example, a magnetic recording means 54 for recording the varying DC voltage.

Figure 5A:
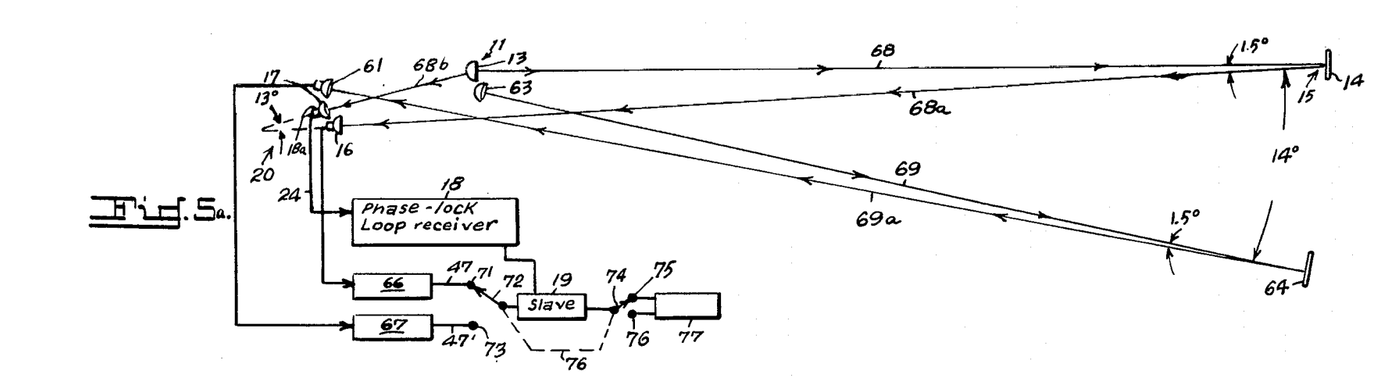
FIG. 5a is a diagrammatic representation in plan view of the combined slant-path and horizontal path meso-cavity specular integrating refractometer.
Figures 5B, 5C:
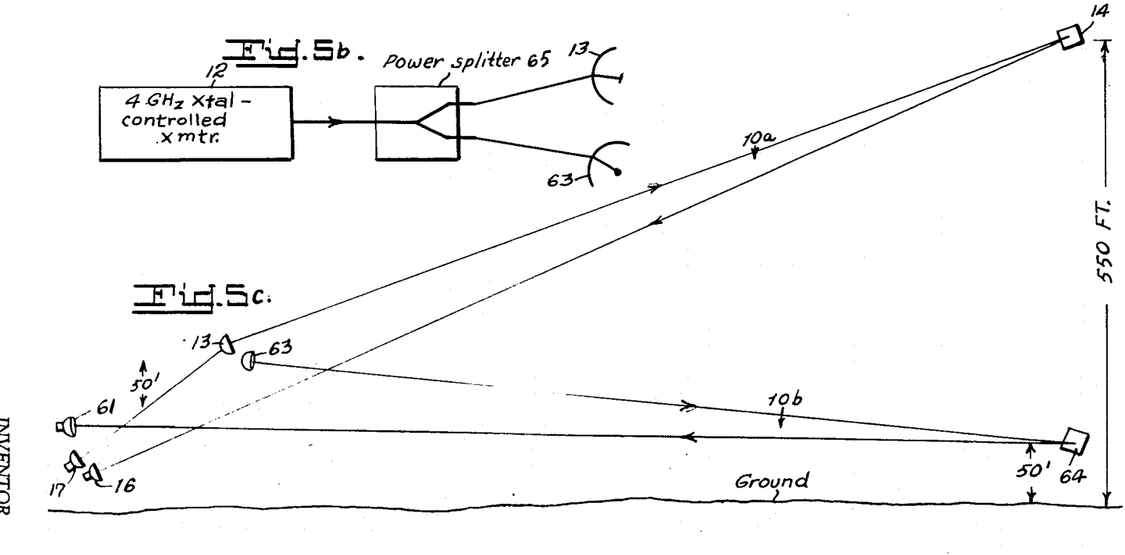

The FIGS. 5 schematically illustrate another embodiment of the invention wherein is disclosed a more accurate means and method for automatically determining real-time variations in the initial refractivity gradient employing in combination a slant-path McSIR and a horizontal-path McSIR with a single transmitter and respective emitting and receiving antenna systems that are cross-polarized as well as angularly directional to minimize mutual interference. In this embodiment the triangular configuration, as disclosed in FIG. 1, is employed in the slant-path 10a wherein 11 indicates the obtuse apex, 15 the acute apex and 20 the third apex. At obtuse apex 11 are located transmitter parabolic antennas 13 and 63 which are oriented so that the main lobe of radiation of each is precisely directed to respective reflectors 14 and 64. These reflectors are horizontally spaced with reflector 64 being at the same elevation as the parabolic antennas in the receiving system and reflector 14 being approximately 500 feet higher in elevation than reflector 64 so that the slant-path 10a is obtained between transmitter parabolic antenna 13 and reflector 14 and a horizontal-path 10b is obtained between transmitter parabolic antenna 63 and reflector 64 as illustrated in FIG. 5b. The major lobe of antenna 13 is directed along slant-path 10a to director 14 and the major lobe of antenna 63 is directed along the horizontal 10b to reflector 64. The interferometers illumination source located at the obtuse apex 11 is a single-frequency highly stabilized crystal-controlled solid state transmitter 12 of rated 750 milliwatt output on 4 GHz (FIG. 5b) which is coupled to a power splitter 65 which has one output thereof coupled to parabolic antenna 13 which has its feed set for vertical polarization, and another output coupled to antenna 63 which has its feed set for horizontal polarization whereby a vertically polarized beam 68 is transmitted along slant-path 10a and a horizontally polarized beam 69 is transmitted along the horizontal path 10b to reflectors 14 and 64, respectively. The included incidence to reflection horizontal angle for the main lobe of each of these reflectors is approximately 1.5°. The reflected main lobe radiation 68a of reflector 14 is precisely aimed back along slant-path 10a to the vertically polarized antenna 16, located at the third apex 20, which is coupled to a first input channel 66, located at antenna 16, which in turn is coupled by means of coaxial cable 47 through attenuator 48 and synchronous sampling switch means 70 to the 1st amplifier 49 of slave receiver 19. Simultaneously, the horizontally polarized beam 69 is transmitted along the horizontal path 10b and reflected 69a by reflector 64 to receiver antenna 61 which is coupled to a second input channel 67 of slave receiver 19 and located at the antenna 61. A coaxial cable 47' couples channel 67 through attenuator 48' and synchronous sampling switch means 70 to the first amplifier 49 of slave receiver 19. Also simultaneously, the weaker but quite coherent back lobe radiation 68b of the transmitter antenna 13 is picked up over the relatively short distance path by antenna 17 which is coupled to input channel 18a of phase-lock loop receiver 18, located at antenna 17, which in turn is coupled to the input of the reference receiver 21 of the phase-lock loop receiver 18 by means of coaxial cable 24.

Figure 6:
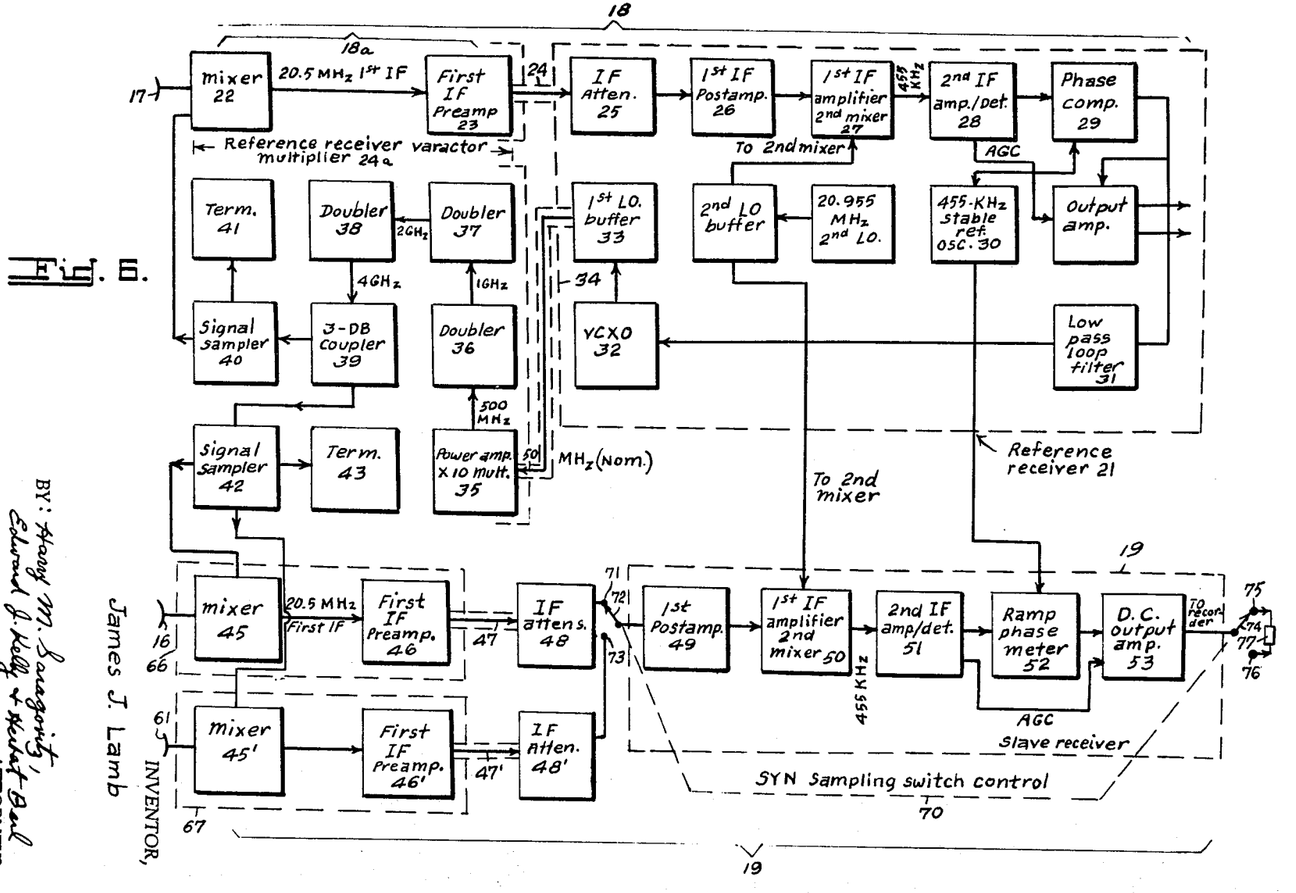
FIG. 6 is a block diagram of the modified radio receiver.

The receiver means modified as indicated in the foregoing and detailed in the block diagram of FIG. 6 consists of a first input channel 66 comprising a first mixer 45 having its input coupled to vertically polarized antenna 16 and its output to first pre-amplifier 46, the output of which is coupled by means of coaxial cable 47 to IF attenuator 48 which has its output coupled to tap 71 and hence to post amplifier 49 when switch arm 72 is in contact with tap 71. Switch arm 74 being operated synchronously with switch arm 72 and connected to the output of the slave receiver is at this time in contact with contact 75 which is connected to one channel of a two channel recorder 77 whereby the output of the slave receiver, as aforedescribed, which is a varying DC voltage directly proportional to variation in atmospheric refractivity along the slant-path 10a is recorded on said one channel. The second input channel 67 is identical to first input channel 66 and consists of a first mixer 45' having its input coupled to the horizontally polarized antenna 61 and its output coupled to first preamplifier 46' the output of which is coupled by means of coaxial cable 47' to IF attenuator 48' which has its output coupled to contact 73 and hence to post amplifier 49 when switch arm 72 is in contact with contact 73. At this time switch arm 74 is in contact with contact 76 connected to another channel of the two channel recorder 77 whereby the output of the slave receiver which is a varying DC voltage directly proportional to variation in atmospheric refractivity along the horizontal path 10b is recorded on said another channel. Thus, it can be seen from the description of this embodiment of the invention that the coherent receiving system utilized therein employs a single phase-lock receiver and a two slave receiver channels to alternately sample the slant-path and horizontal path refractivity, respectively, to obtain an output differential representing real-time variations in the initial refractivity gradient.

Figure 7A:
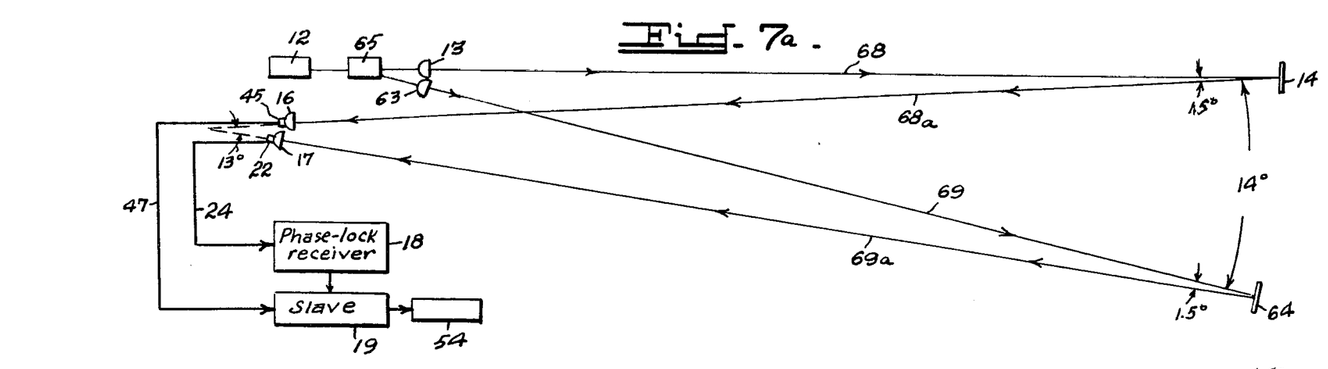
FIG. 7a is a diagrammatical representation in plan view of a further embodiment of the slant-path and horizontal path meso-cavity specular integrating refractometer.
Figure 7B:
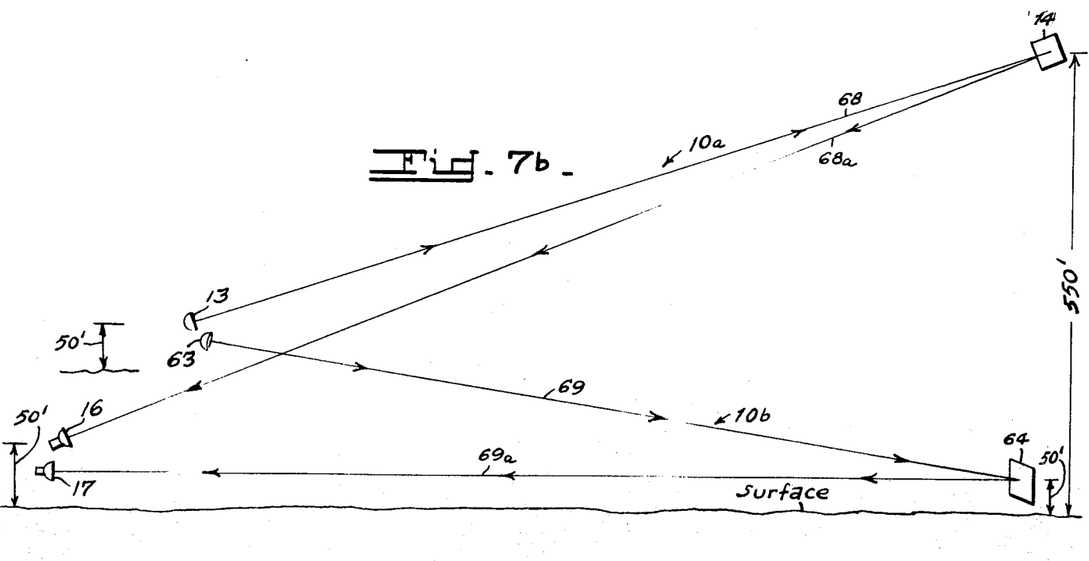

The FIGS. 7 show the geometric arrangement of the McSIR combination for direct indication of refractivity gradient as the phase differential between the waves propagated simultaneously over the horizontal path and slant-path of equal geometric length; that is to say the two paths of transmission should preferably be of the same length and the two paths of refelction should preferably be of the same length. These preferred path lengths are also applicable to the configuration shown in FIGS. 5. In this embodiment the vertically polarized antenna 13 and the horizontally polarized antenna 63 are illuminated by means of transmitter 12 through power splitter 65. The reflectors 14 and 64 are laterally spaced and positioned in elevation as described in conjunction with FIGS. 5. The vertically polarized wave 68 is radiated along slant-path 10a by antenna 13 to reflector 14 which precisely reflects it back along the slant-path as indicated by reference numeral 68a to the main lobe of the vertically polarized receiver antenna 16 the output of which is coupled through mixer 45 and IF preamplifier 46 via coaxial cable 47 to the input of the slave receiver. Thus, it can be seen, considering the detailed description of the functioning of the receiver means described in conjunction with FIG. 4, that the amplified 455 KHz output of the IF amplifier of module 51 through the detector thereof is applied to the signal input of ramp phasemeter 52 and the phase angle difference between the slant-path and horizontal path signals is read out from ramp phasemeter 52 as a varying DC voltage proportional in electrical angle variation in degrees providing a direct indication of refractivity gradient as the phase differential between the waves propagated simultaneously over the horizontal path and slant-path of equal length.

In regard to the receiving antennas, particularly with reference to the system configurations shown in the FIGS. 5 and 7, they are oriented in angle with respect to the transmitting antennas as well as with respect to each other to minimize interference from back lobe radiation of the cross-polarized transmitting antennas as well as mutual interference, the angle between the receiving antennas axes being approximately 13° for the 6-foot disk antennas operating at 4 GHz in this instance.

I claim:

1. A real-time initial atmospheric refractivity gradient measuring system comprising in combination:

a single-frequency coherent radio wave interferometer of obtuse triangular configuration;

a microwave generator located at a site substantially at earth surface elevation coupled to a directional beam emitter positioned at the obtuse apex of the triangular configuration at the elevation of said site and oriented to aim a direct microwave beam signal along a slant-path relative to a path horizontal to the earth surface toward the most acute apex of the triangular configuration;

a passive plane reflector positioned at the most acute apex of said triangular configuration and oriented to reflect and critically aim said microwave signal along said slant-path toward the less acute angle of said triangular configuration at said site;

a coherent radio receiver means consisting of a superheterodyne phase-lock receiver locked in phase with the direct microwave beam signal and a superheterodyne receiver comprising a slave receiver coupled to the superheterodyne phase-lock receiver;

a first parabolic antenna located on said site at the third apex of said triangular configuration coupled to the input of the phase-lock loop receiver and oriented in a direction most favorably to the incidental rearward radiation of the direct microwave beam signal by said emitter and least favorably directional to the critically aimed reflected microwave signal whereby said direct microwave signal is applied to the input of the phase-lock receiver;

a second parabolic antenna at said third apex coupled to the input of said slave receiver and oriented along said slant-path in a direction most favorably directional to the critically aimed reflected microwave signal and least favorably to said incidental rearward radiation whereby said reflected microwave signal is applied to the input of said slave receiver;

said superheterodyne phase-lock receiver locked in phase to said direct microwave signal from said emitter by phase-lock loop circuit means therein and supplying coherent locally generated oscillatory energy to said slave receiver for microwave to intermediate frequency, detection and phase reference;

a phase comparator coupled to the output of said slave receiver providing a resultant difference voltage proportional to the phase angle between intermediate frequency voltages in said slave receiver derived from the direct and reflected microwave signals, said difference voltage representing variation of the phase velocity of said reflected signal due to changes in the refractive index in the two-way path intermediate the emitter and plane reflector;

recording means coupled to the output of the phase comparator for recording the difference voltage; and continuously operating surface means positioned on said horizontal path for providing data used to calculate the surface reference value of refractivity.

2. The invention in accordance with claim 1 wherein said continuously operating surface means comprises meteorological instrumentation positioned substantially at said earth surface midway between the longitudinal limits of the slant-path providing data used to calculate surface reference values of refractivity from which the slant-path refractivity obtained by said radio wave interferometer is subtracted to obtain the concurrent initial gradient value.

3. A real-time initial atmospheric refractivity gradient measuring system comprising in combination:

a first radio wave interferometer of obtuse configuration consisting of a first directional beam emitter positioned substantially at a site of earth surface elevation at the obtuse apex of a triangular configuration and oriented to aim a first direct microwave beam signal along a slant-path relative to a horizontal path to the earth surface toward the most acute apex of the triangular configuration;

a first reflector positioned at said acute apex and oriented to reflect and critically aim said first direct microwave signal along said slant-path toward the less acute angle of said configuration;

a first parabolic receiving antenna located at said less acute angle and oriented along said slant-path for receiving the reflected first microwave beam signal; and a second parabolic receiving antenna located at said less acute angle and oriented most favorably to the rearward radiation of said first emitter;

a second radio wave interferometer consisting of a second directional beam emitter positioned adjacent said first emitter and oriented to aim a second direct microwave beam signal along said horizontal path;

a second reflector on said horizontal path and laterally disposed to said first reflector and oriented to reflect and critically aim said second direct microwave beam along the horizontal path; and a third parabolic receiving antenna located adjacent said second receiving antenna and oriented along said horizontal path to receive the reflected said second microwave beam;

means for simultaneously illuminating said first and second emitters;

a coherent radio receiver means consisting of a superheterodyne phase-lock receiver locked in phase with said first microwave beam signal and a slave receiver coupled to the superheterodyne receiver;

first and second radio input channels having their inputs coupled to said first and third receiving antennas, respectively, and their outputs adapted to be alternatively switched to the input of said slave receiver whereby the signals derived from said first and second reflected beams are alternatively applied to the input of the slave receiver;

means coupling said second receiving antenna to the input of said phase-lock receiver whereby said phase-lock receiver is locked in phase to said first direct microwave signal from said first emitter by phase-lock loop circuit means therein and supplies coherent locally generated oscillatory energy to the slave receiver for microwave to intermediate frequency, detection and phase reference;

a phase comparator coupled to the output of said slave receiver providing resultant difference voltages proportional to the phase angle between intermediate frequency voltages in said slave receiver derived from the direct and the reflected microwave signals along said slant-path and the direct and the reflected microwave signals along said horizontal path, said difference voltages representing variation of the phase velocities of said reflected signals in the two-way slant-path intermediate the first emitter and first reflector and the two-way horizontal path intermediate the second emitter and second reflector; and synchronous switching means adapted to alternately switch said first and second radio input channels to the input of said slave receiver and to alternately switch the output of the slave receiver to a first channel and a second channel of recording means.

4. A real-time initial atmospheric refractivity gradient measuring system comprising in combination:

a first radio wave interferometer consisting of a first directional beam emitter positioned substantially at a site of earth surface elevation and oriented to aim a first direct microwave beam signal along a slant-path relative to a horizontal path to the earth surface;

a first reflector positioned on said slant-path at a point remote from said first beam emitter and oriented to reflect and critically aim said first direct microwave signal along said slant-path; and a first parabolic receiving antenna positioned on said site and oriented along said slant-path for receiving the reflected said first microwave beam signal;

a second radio wave interferometer consisting of a second directional beam emitter located on said site adjacent to and angularly disposed to said first emitter and oriented to aim a second microwave beam signal along said horizontal path;

a second reflector on said horizontal path and laterally disposed to said first reflector and oriented to reflect and critically aim said second direct microwave beam along the horizontal path; and a second parabolic receiving antenna positioned adjacent first parabolic antenna and oriented along said horizontal path to receive the reflected second micorwave beam signal;

means for simultaneously illuminating said first and second emitters;

a coherent radio receiver means consisting of a superheterodyne phase-lock receiver locked in phase and a slave receiver coupled to the superheterodyne receiver;

means coupling said second receiving antenna to the input of said phase-lock receiver whereby said phase-lock receiver is locked in phase to said second reflected microwave signal by phase-lock loop circuit means therein and supplies coherent locally generated oscillatory energy to the slave receiver for microwave to intermediate frequency, detection and phase reference;

a phase comparator coupled to the output of said slave receiver providing resultant difference voltages proportional to the phase angle between intermediate frequency voltages in said slave receiver derived from said reflected microwave beam signals along said slant-path and the reflected microwave signals along said horizontal path, said difference voltage representing variation of the phase velocities of said reflected signals due to changes in refractive index in the two-way slant-path intermediate the first emitter and first reflector and the two-way horizontal path intermediate the second emitter and second reflector; and recording means coupled to the output of the phase comparator for recording the difference voltage variations.

5. The invention in accordance with claim 3 wherein said means for simultaneously illuminating said first and second emitters comprises a single frequency microwave generator for generating a frequency stable continuous microwave signal coupled to the input of a power splitter having a first output coupled to said first emitter and a second output coupled to said second emitter.

6. The invention in accordance with claim 3 wherein the length of said slant-path between said first emitter and said first reflector equals the length of the horizontal path between said second emitter and said second reflector.

7. The invention in accordance with claim 3 wherein said reflector on the slant-path is at least 100 meters higher in elevation than the elevation at said horizontal path.

8. The invention in accordance with claim 3 wherein said first emitter is vertically polarized and said second emitter is horizontally polarized.

9. The invention in accordance with claim 3 wherein said first receiving antenna is vertically polarized and said second receiving antenna is horizontally polarized.

10. The invention in accordance with claim 3 wherein the included incidence to reflection horizontal angle for the main lobe of each said reflector is approximately 1.5°.

11. The invention in accordance with claim 3 wherein said receiving antennas are angularly oriented with respect to each other and with respect to said emitters whereby mutual interference between the receiving antennas as well as interference from back-lobe radiation from said emitters is minimized.

* * * * *